United States Patent [19]
Robertson

[11] Patent Number: 5,988,895
[45] Date of Patent: Nov. 23, 1999

[54] FILM CARTRIDGE WITH VISUAL EXPOSURE STATUS INDICATOR

[75] Inventor: Jeffrey C. Robertson, Rochester, N.Y.

[73] Assignee: Eastman Kodak Company, Rochester, N.Y.

[21] Appl. No.: 09/014,123

[22] Filed: Jan. 27, 1998

[51] Int. Cl.⁶ .................................................. G03B 17/24
[52] U.S. Cl. ............................................................ 396/515
[58] Field of Search ................................... 396/284, 285, 396/515

[56] References Cited

U.S. PATENT DOCUMENTS

| | | |
|---|---|---|
| 5,115,268 | 5/1992 | Kitagawa et al. . |
| 5,258,789 | 11/1993 | Labaziewicz . |
| 5,278,600 | 1/1994 | Takahashi et al. . |
| 5,463,435 | 10/1995 | Ezawa . |
| 5,513,627 | 5/1996 | Dwyer . |
| 5,548,368 | 8/1996 | Lee et al. . |
| 5,552,849 | 9/1996 | DiRisio et al. . |
| 5,602,611 | 2/1997 | Takatori et al. . |
| 5,666,575 | 9/1997 | Stephenson et al. . |
| 5,708,546 | 1/1998 | Manico et al. ........................... 396/515 |

FOREIGN PATENT DOCUMENTS

| | | |
|---|---|---|
| 0 762 186 A3 | 4/1996 | European Pat. Off. . |
| 197 12419 A1 | 10/1997 | Germany . |

Primary Examiner—David M. Gray
Attorney, Agent, or Firm—Roger A. Fields

[57] ABSTRACT

A film cartridge comprising a cartridge housing, a film spool rotatable inside the housing, and first and second indicators fixed to the housing and to the film spool in order that the first indicator originally at least partially obscures the second indicator to provide an unused film indication and which are positionally reversed in response to spool rotation in a predetermined direction for the second indicator to then at least partially obscure the first indicator to provide a used film indication, is characterized in that the first and second indicators are first and second rings which each have a ring-admitting slit for receiving the other ring to allow the first and second rings to be positionally reversed in response to spool rotation in the predetermined direction, and at least one of the first and second rings has an integral pivotal flap at its ring-admitting slit which is angled not to move through the ring-admitting slit in the other ring and allow the first ring to continue to obscure the second ring when said film spool is rotated in an opposite direction and to move through the ring-admitting slit in the other ring to cause the first and second rings to move through the respective slits and be positionally reversed in response to spool rotation in the predetermined direction.

5 Claims, 8 Drawing Sheets

FILM CARTRIDGE WITH VISUAL EXPOSURE STATUS INDICATOR

CROSS REFERENCE TO RELATED APPLICATIONS

Reference is made to commonly assigned copending application Ser. No. 08/781,766 entitled FILM CARTRIDGE WITH VISUAL EXPOSURE STATUS INDICATOR and filed Jan. 10, 1997 in the names of Joseph A. Manico and John A. Agostinelli.

FIELD OF THE INVENTION

The invention relates generally to the field of photography, and in particular to a film cartridge with a visual exposure status indicator for indicating whether a filmstrip inside the cartridge housing has been exposed. More specifically, the invention relates to a film exposure status indicator that can be used with a conventional type cartridge.

BACKGROUND OF THE INVENTION

It is known for a film cartridge to have a film exposure status indicator for providing a visual indication that a filmstrip inside the cartridge housing has been exposed. Often, the film exposure status indicator is one which cannot be used with a conventional type cartridge, but instead requires a special or new cartridge.

For example, prior art U.S. Pat. No. 5,278,600, issued Jan. 11, 1994, discloses an atypical film cartridge comprising a film spool rotatable inside the cartridge housing, an indicator window in an end cap of the cartridge housing, an annular indicator wheel rotatable inside the cartridge housing behind the indicator window to move a film exposed indication on the indicator wheel to the indication window, and an annular drive wheel rotatably linked with the film spool for rotating the indicator wheel to move the film exposed indication to the indication window. A pin and receiver clutch device transmits movement of the drive wheel to the indicator wheel when the film spool is rotated in a film unwinding direction, and leaves the indicator wheel and the drive wheel disconnected when the film spool is rotated in a film winding direction. Since the indicator wheel is located inside the cartridge housing, it cannot be used with a conventional type cartridge.

Another example is prior art U.S. Pat. No. 5,153,627 issued Oct. 6, 1992 which discloses an atypical film cartridge comprising a cartridge housing, a film spool rotatable inside the cartridge housing in film unwinding and rewinding directions, and a first indicator integrally formed with the cartridge housing and a second indicator secured to the film spool in order that the first indicator at least partially obscures the second indicator to provide an unused film indication when the film spool is rotated in the film unwinding direction and which are positionally reversed in response to spool rotation in the film rewinding direction for the second indicator to at least partially obscure the first indicator to provide a used film indication. Since the first indicator is integrally formed with the cartridge housing, it cannot be used with a conventional type cartridge.

The Cross-Referenced Application

The cross-referenced application discloses a film cartridge comprising a cartridge housing with a peripherally raised end cap which forms an open recess, a film spool rotatable inside the cartridge housing in film unwinding and rewinding directions and having a protruding spool end portion which coaxially projects from the cartridge housing into the recess, and a film exposure status indicator capable of changing state to provide a visual indication of the exposure status of a filmstrip for the film cartridge. A ring having a radial slit coaxially engages the protruding spool end portion in the recess to be rotated concurrently with the spool end portion in the film unwinding and rewinding directions. The film exposure status indicator is a flexible helix that is coiled around the protruding spool end portion in the recess and longitudinally extends through the radial slit in the ring. One end portion of the helix is fixed in place beneath the ring to be concealed from view and to prevent rotation of the helix when the ring is rotated with the film spool in the film unwinding and rewinding directions. A further portion of the helix is initially located above the ring to be visible and is adapted to be compressed beneath the ring to disappear from view responsive to movement of the radial slit along the further portion when the ring is rotated with the film spool in the film unwinding direction. This provides a change of state of the helix from being visible above the ring to being concealed beneath the ring. The ring and the helix are designed to fit as a unit on the protruding spool end portion and, therefore, can be used with a conventional type cartridge.

SUMMARY OF THE INVENTION

A film cartridge comprising a cartridge housing, a film spool rotatable inside the housing, and first and second indicators fixed to the housing and to the film spool in order that the first indicator originally at least partially obscures the second indicator to provide an unused film indication and which are positionally reversed in response to spool rotation in a predetermined direction for the second indicator to then at least partially obscure the first indicator to provide a used film indication, is characterized in that:

the first and second indicators are first and second rings which each have a ring-admitting slit for receiving the other ring to allow the first and second rings to be positionally reversed in response to spool rotation in the predetermined direction, and at least one of the first and second rings has an integral pivotal flap at its ring-admitting slit which is angled not to move through the ring-admitting slit in the other ring and allow the first ring to continue to obscure the second ring when said film spool is rotated in an opposite direction and to move through the ring-admitting slit in the other ring to cause the first and second rings to move through the respective slits and be positionally reversed in response to spool rotation in the predetermined direction.

DETAILED DESCRIPTION OF THE INVENTION

The invention is disclosed as being embodied preferably in a conventional type 35 mm film cartridge. Because the features of a 35 mm film cartridge are generally known, the description which follows is directed in particular only to those elements forming part of or cooperating directly with the disclosed embodiment. It is to be understood, however, that other elements may take various forms known to a person of ordinary skill in the art.

Figure 1:
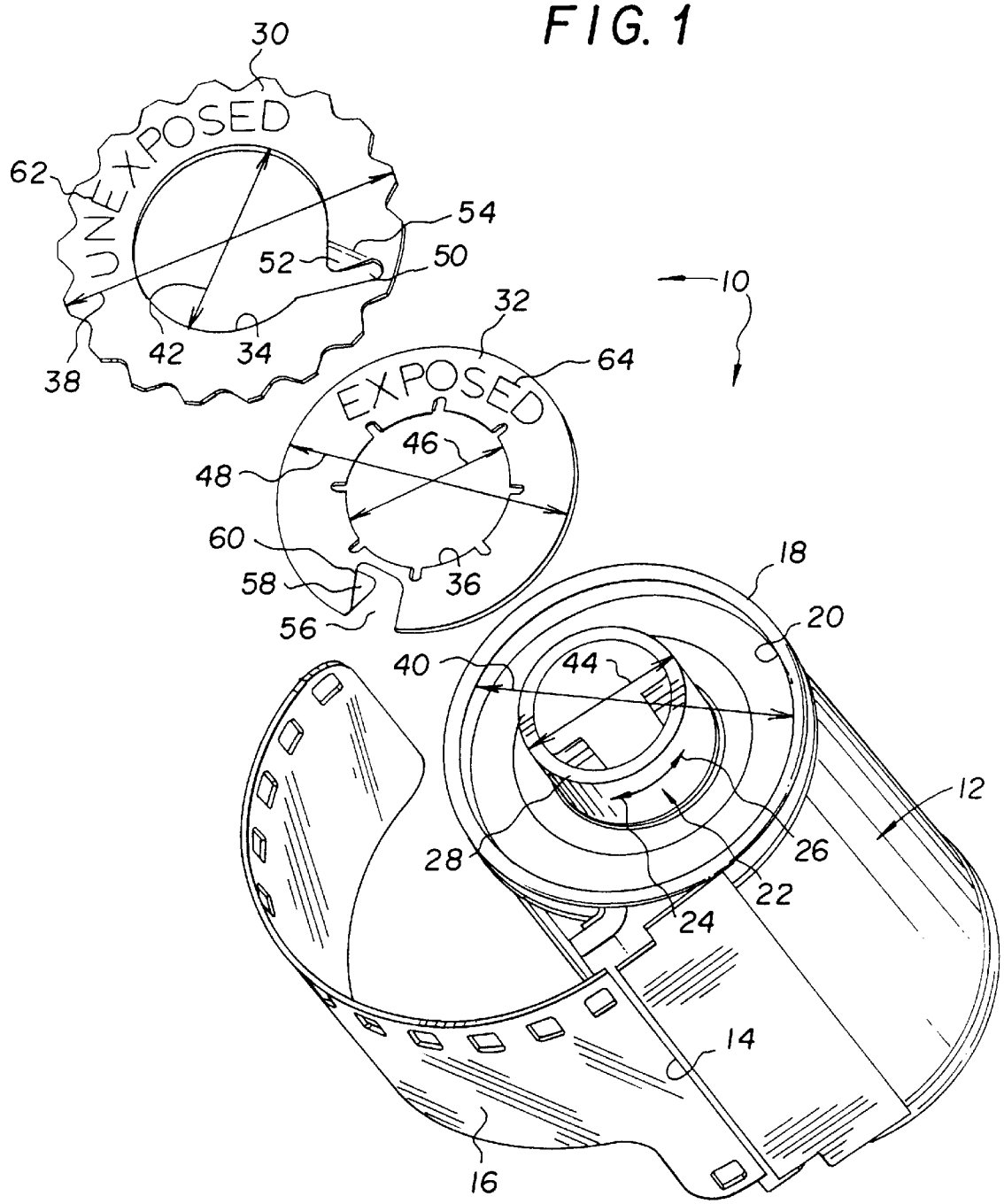
FIG. 1 is an exploded perspective view of a film cartridge with a visual exposure status indicator according to a preferred embodiment of the invention, showing the indicator in an "UNEXPOSED" indication.
Figure 2:
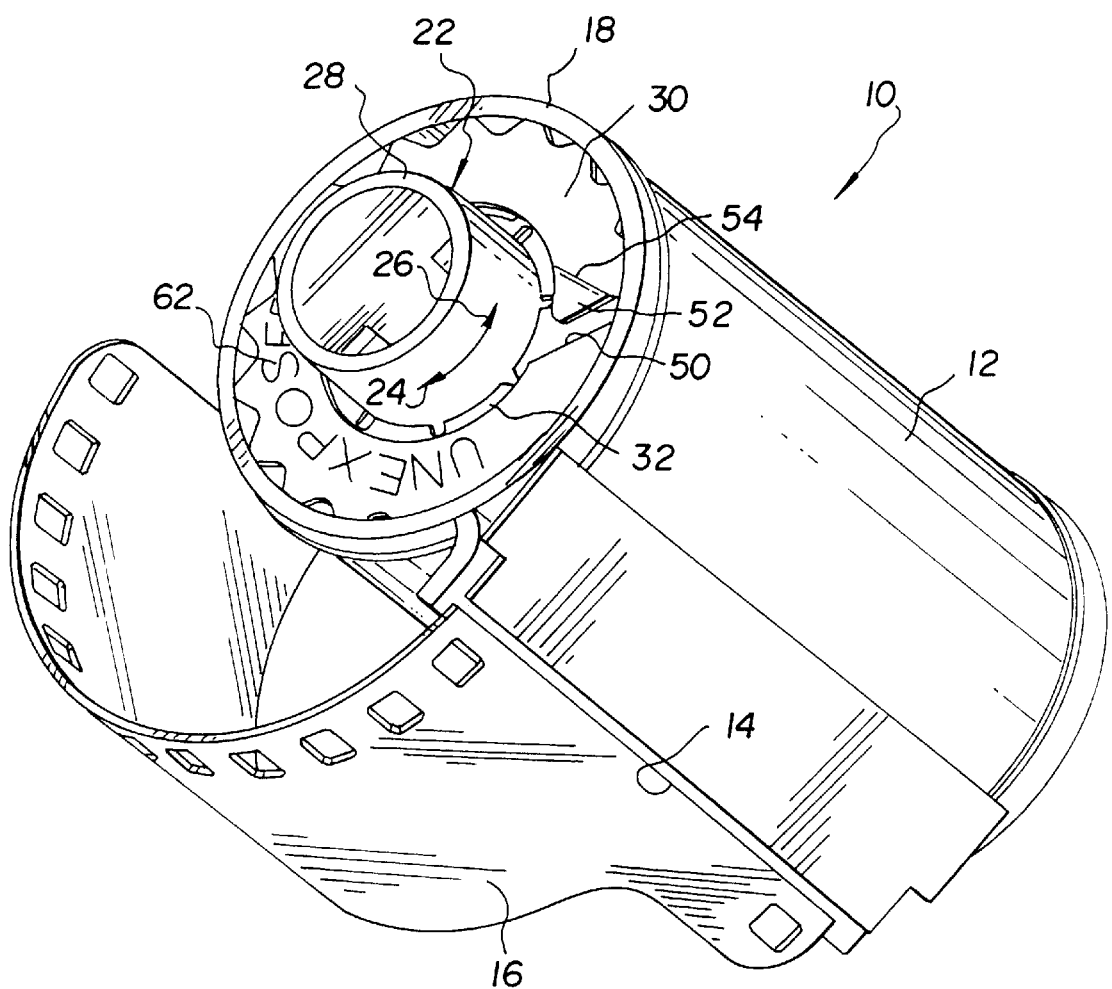
FIG. 2 is an assembled perspective view of the film cartridge similar to FIG. 1.
Figure 3:
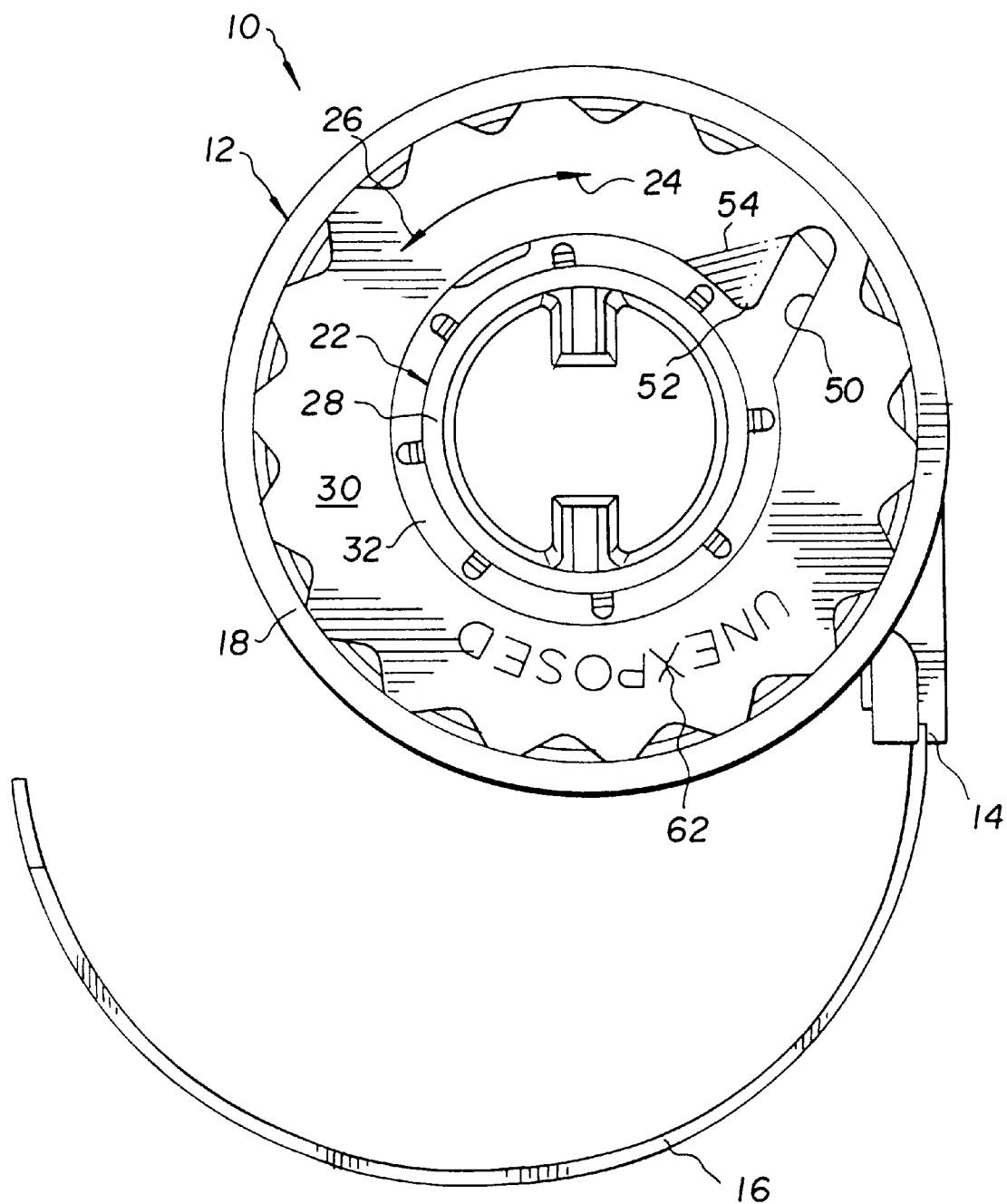
FIG. 3 is a top plan or end view of the film cartridge similar to FIG. 1.
Figure 4:
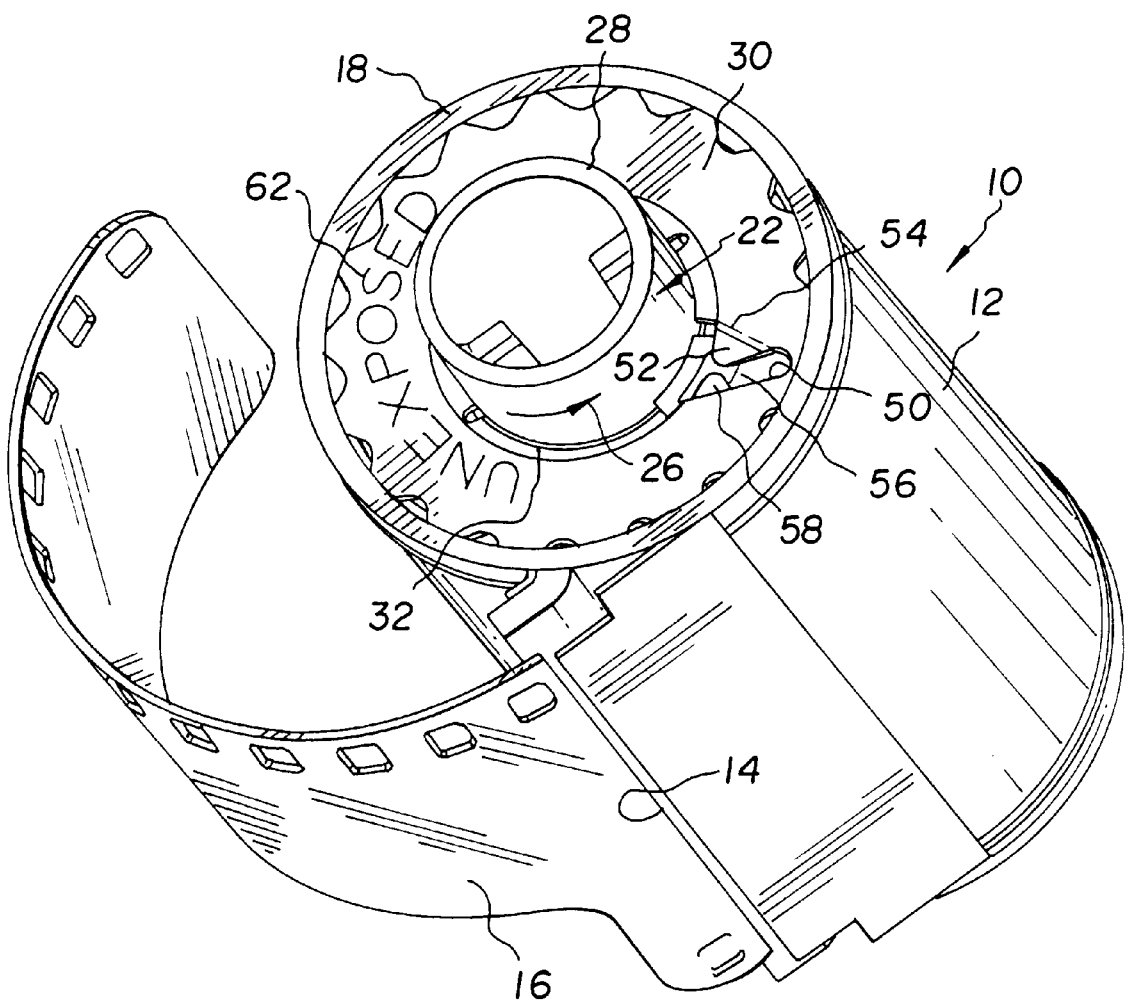
FIGS. 4–6 are assembled perspective views of the film cartridge, depicting rotation of a film spool in a film rewinding direction to change the indicator from the "UNEXPOSED" indication to an "EXPOSED" indication.
Figure 5:
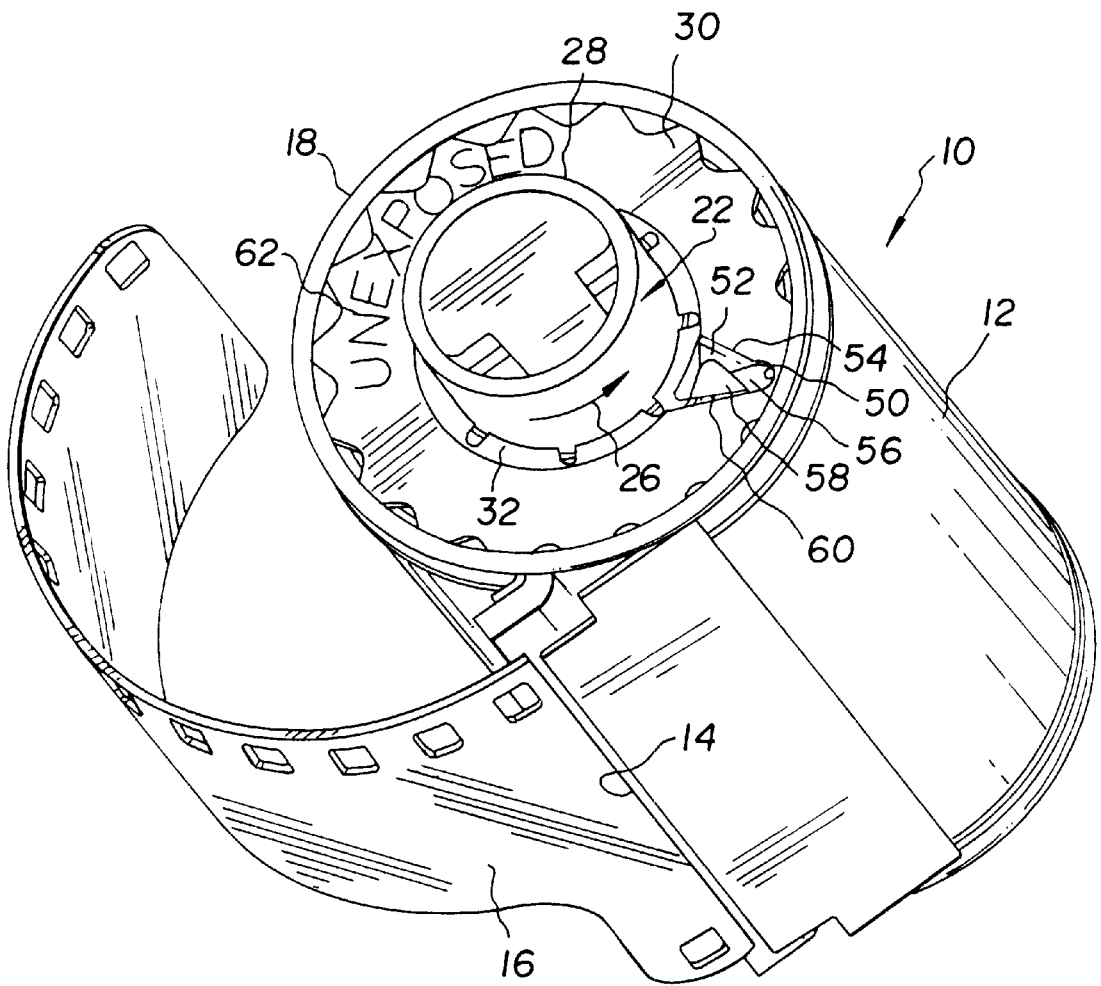
Figure 6:
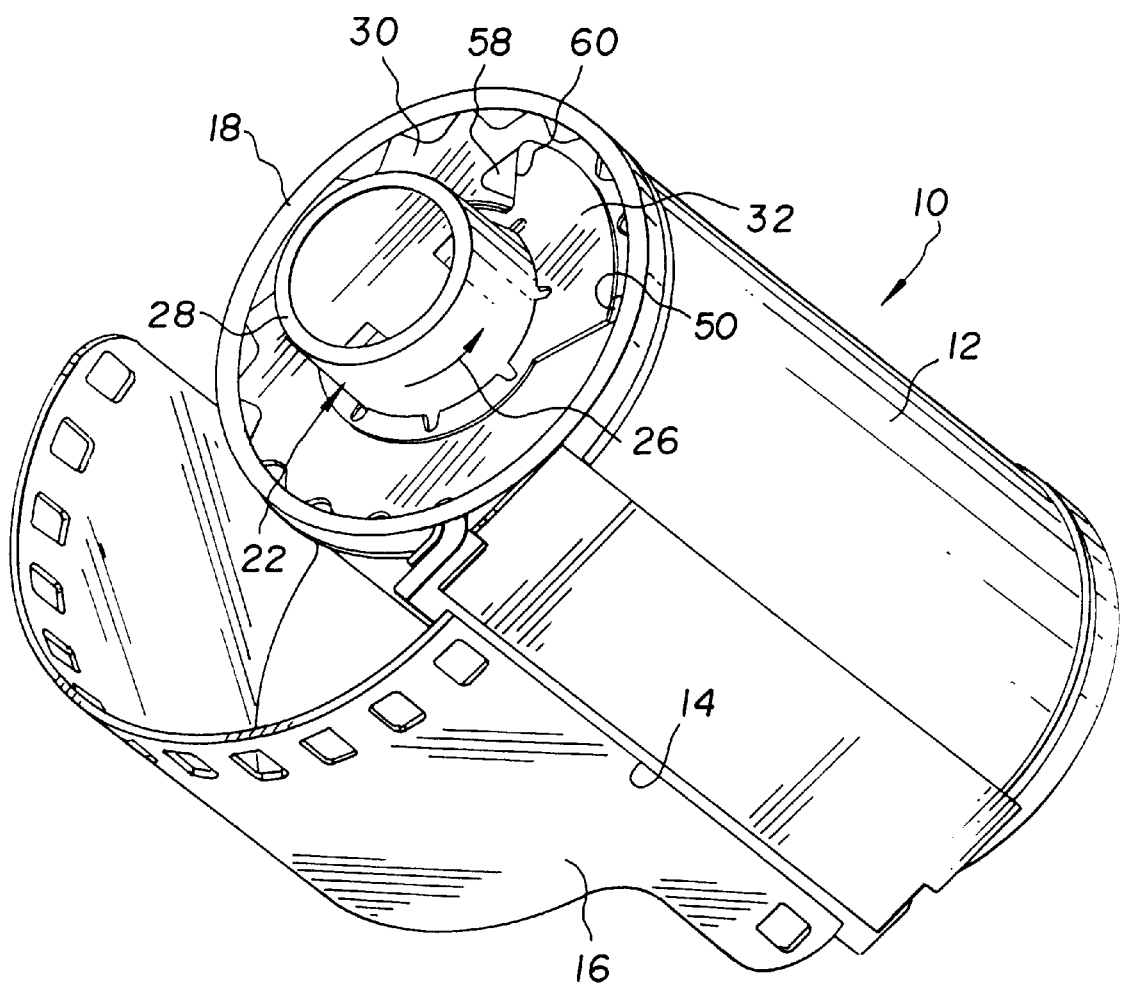

Referring now to the drawings, FIGS. 1–3 show a conventional type 35 mm film cartridge 10 comprising a cartridge housing 12 having a plush-lined light-trapping film egress/ingress slot 14 for a filmstrip 16 and a peripherally raised end cap 18 that defines a peripherally round open-top recess 20. A flanged film spool 22 rotatable inside the cartridge housing 12 in film unwinding and rewinding directions 24 and 26 has a protruding spool end portion 28 that coaxially projects from the cartridge housing into the recess 20.

As shown in FIGS. 1–3, an opaque planar flexible outer ring 30 and an opaque planar flexible inner ring 32 are individually inserted into the recess 20, one on top of the other in a parallel slightly-spaced relationship. The outer and inner rings 30 and 32 have center openings 34 and 36 that receive the protruding spool end portion 28. The outer ring 30 has an outer diameter 38 that is slightly less than the diameter 40 of the recess 20 to fix the outer ring in the recess to the end cap 18 and an inner diameter 42 at the center opening 34 of the outer ring that is slightly greater than the diameter 44 of the protruding spool end portion 28 to allow the film spool 22 to be rotated relative to the outer ring in the film unwinding and rewinding directions 24 and 26. The inner ring 32 has an inner diameter 46 at the center opening 36 of the inner ring that is slightly less than the diameter 44 of the protruding spool end portion 28 to make the inner ring rotate with the film spool 22 in the film unwinding and rewinding directions 24 and 26 and an outer diameter 48 that is slightly less than the diameter 40 of the recess 20 to allow the inner ring to be rotated relative to the outer ring 30 in the film unwinding and rewinding directions. The outer ring 30 has an inclined (non-radial) ring-admitting slit or cut-out 50 which only partially extends through the outer ring, and it has an integral pivotal flap 52 at the slit which is inclined or bent downward from the slit as shown in FIG. 1 and is pivotable along a weakened bend-line 54. The inner ring 32 has a radial ring-admitting slit or cut-out 56 which only partially extends through the inner ring, and it has an integral pivotal flap 58 at the slit which is inclined or bent upward from the slit as shown in FIG. 1 and is pivotable along a weakened bend-line 60.

Operation

As shown in FIGS. 1–3, the outer ring 30 originally obscures the inner ring 32 and an "UNEXPOSED" indication 62 on the outer ring 30 is visible to inform the photographer that the film cartridge 10 is a fresh unused one.

When the film spool 22 is rotated in the unwinding direction 24, the inner ring 32 is similarly rotated to cause the ring-admitting slit 56 in the inner ring to be moved beneath the ring-admitting slit 50 in the outer ring. Simultaneously, the inclined-downward pivotal flap 52 of the outer ring 30 blocks the inclined-upward pivotal flap 58 of the inner ring 32 from entering the ring-admitting slit 50 in the outer ring 32. Instead, the inclined-downward pivotal flap 52 of the outer ring 30 is moved beneath the inclined-upward pivotal flap 58 of the inner ring 32. As a result, the outer ring 30 continues to obscure the inner ring 32 as shown in FIGS. 2 and 3, when the film spool 22 is rotated in the unwinding direction 24.

Figure 7:
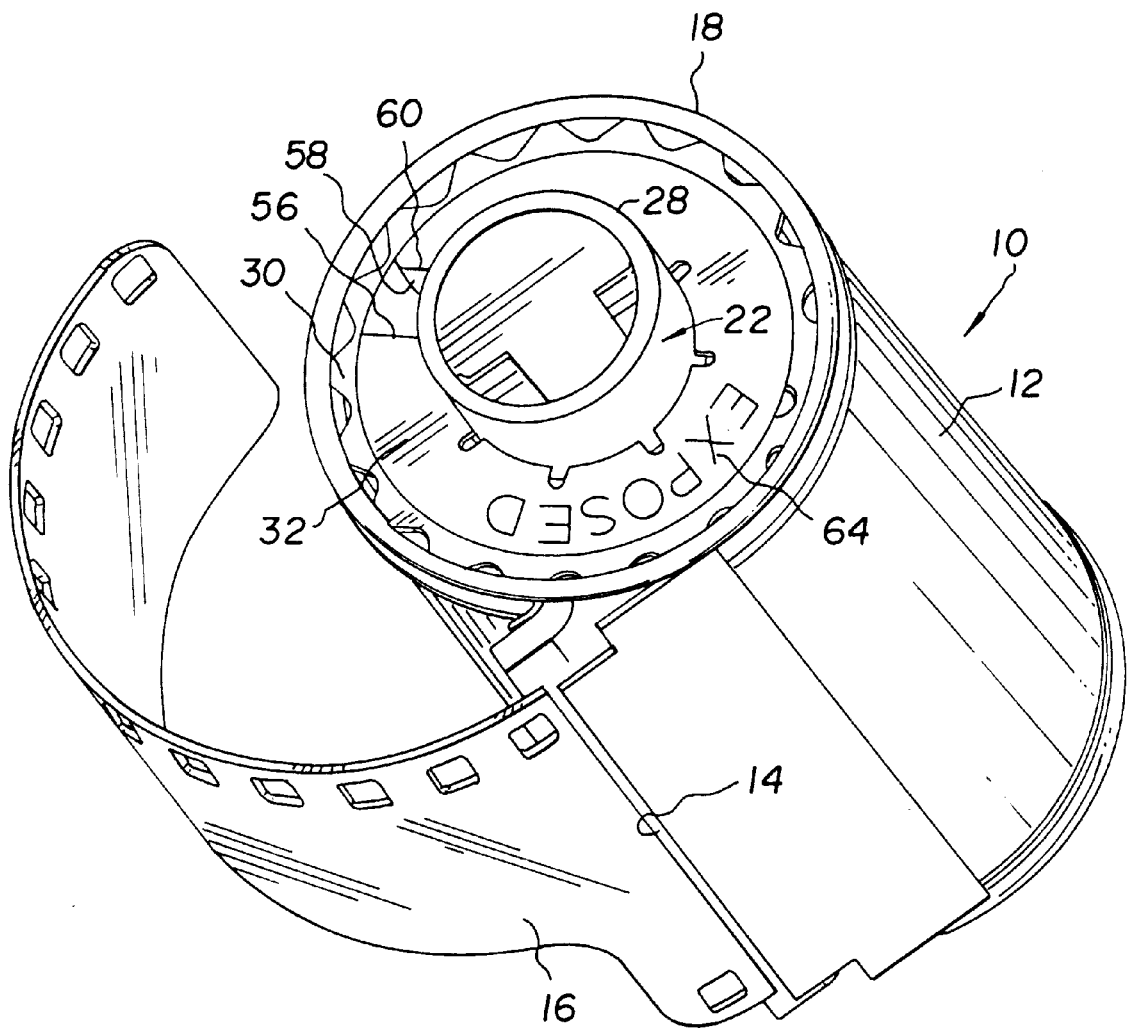
FIG. 7 is an assembled perspective view of the film cartridge, showing the indicator in the "EXPOSED" indication.
Figure 8:
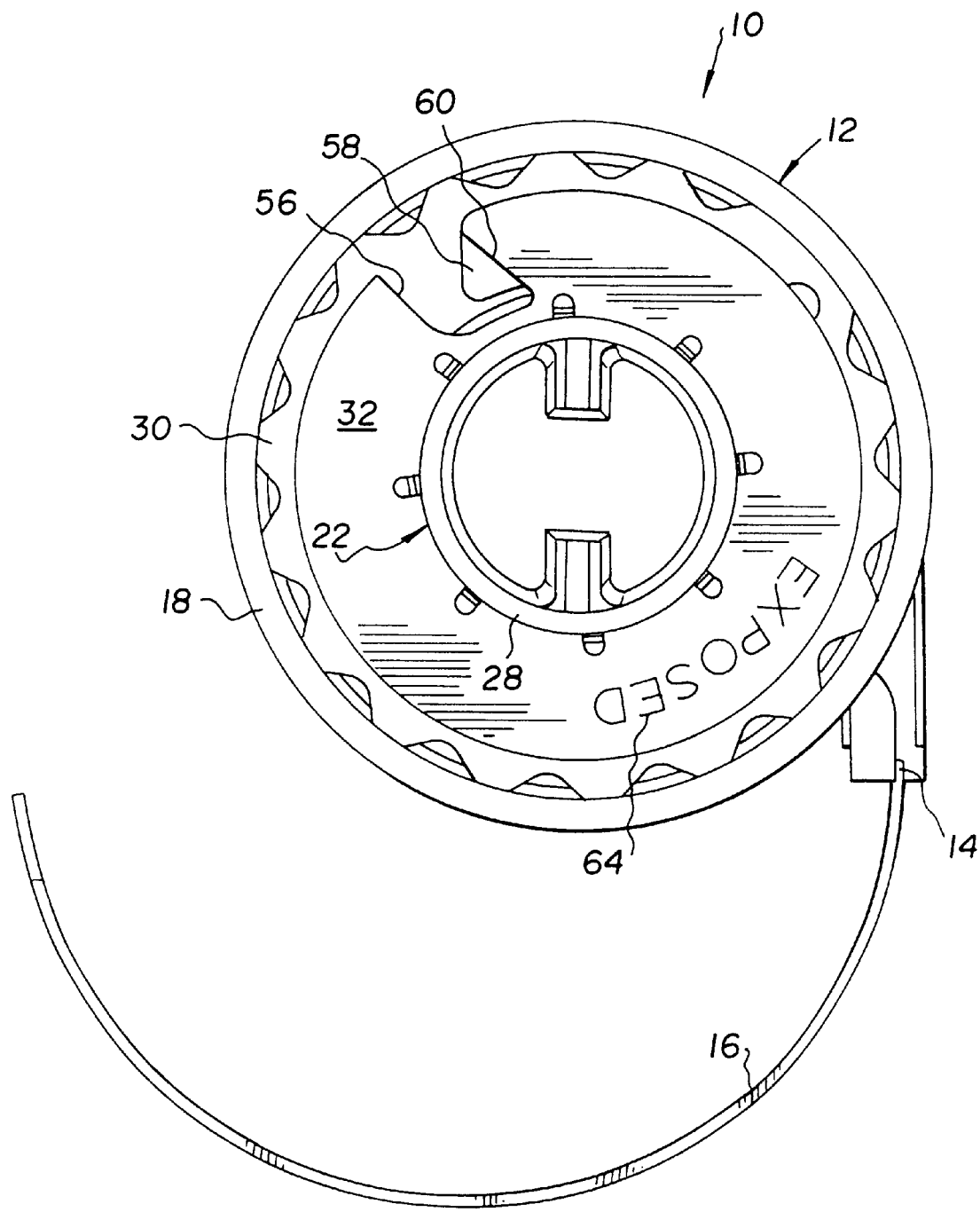
FIG. 8 is a top plan or end view of the film cartridge similar to FIG. 7.

When the film spool 22 is rotated in the film rewinding direction 26, the inner ring 32 is similarly rotated to cause the ring-admitting slit 56 in the inner ring to be moved underneath the ring-admitting slit 50 in the outer ring. In this instance, the inclined-upward pivotal flap 58 of the inner ring 32 is moved against the inclined-downward pivotal flap 52 of the outer ring 30 and the two rings begin to increasingly overlap. See FIGS,. 4 and 5. This causes the inclined-upward pivotal flap 58 of the inner ring 32 to enter the ring-admitting slit 50 in the outer ring 30 and, simultaneously, causes the inclined-downward pivotal flap 52 of the outer ring 30 to enter the ring-admitting slit 56 in the inner ring 32. As a result, the inner and outer rings 32 and 30 move through the respective slits 50 and 56 and are positionally reversed in response to spool rotation in the rewinding direction 26. See FIGS. 7 and 8. Thus, the inner ring 32 becomes an outer ring and the outer ring 30 becomes an inner ring and an "EXPOSED" indication 64 on the (then) outer ring 32 is visible to inform the photographer that the film cartridge 10 is a used one.

The invention has been described with reference to a preferred embodiment. However, it will be appreciated that variations and modifications can be effected by a person of ordinary skill in the art without departing from the scope of the invention.

PARTS LIST 10. film cartridge
12. cartridge housing
14. film egress/ingress slot
16. filmstrip
18. end cap
20. recess
22. film spool
24. film unwinding direction
26. film rewinding direction
28. protruding spool end portion
30. planar outer ring
32. planar inner ring
34. center opening
36. center opening
38. outer diameter
40. recess diameter
42. inner diameter
44. spool end portion diameter
46. inner diameter
48. outer diameter
50. ring-admitting slit
52. pivotal flap
54. bend-line
56. ring-admitting slit
58. pivotal flap
60. bend-line
62. "UNEXPOSED" indication
64. "EXPOSED" indication

What is claimed is:

1. A film cartridge comprising a cartridge housing, a film spool rotatable inside said housing, and first and second indicators fixed to said housing and to said film spool in order that said first indicator originally at least partially obscures said second indicator to provide an unused film indication and which are positionally reversed in response to spool rotation in a predetermined direction for the second indicator to then at least partially obscure the first indicator to provide a used film indication, is characterized in that:

said first and second indicators are first and second rings which each have a ring-admitting slit for receiving the other ring to allow the first and second rings to be positionally reversed in response to spool rotation in the predetermined direction, and at least one of said first and second rings has an integral pivotal flap at its ring-admitting slit which is angled not to move through said ring-admitting slit in the other ring and allow said first ring to continue to obscure said second ring when said film spool is rotated in an opposite direction and to move through the ring-admitting slit in the other ring to cause said first and second rings to move through the respective slits and be positionally reversed in response to spool rotation in the predetermined direction.

2. A film cartridge comprising a cartridge housing, a film spool rotatable inside said housing in film unwinding and rewinding directions, and first and second indicators fixed to said housing and to said film spool in order that said first indicator at least partially obscures said second indicator to provide an unused film indication when said film spool is rotated in the film unwinding direction and which are positionally reversed in response to spool rotation in the film rewinding direction for the second indicator to at least partially obscure the first indicator to provide a used film indication, is characterized in that:

said first indicator is a first planar ring having a ring-admitting slit and an integral pivotal flap at said slit which is angled in a predetermined direction from said first planar ring; and said second indicator is a second planar ring having a ring-admitting slit and an integral pivotal flap at the slit which is angled in another direction from said second planar ring that is the opposite of the predetermined direction said pivotal flap of the first planar ring is angled, whereby said pivotal flap of the first planar ring will block said pivotal flap of the second planar ring from entering said ring-admitting slit in the first planar to allow said first planar ring to continue to obscure said second planar ring when said film spool is rotated in the film unwinding direction and said pivotal flap of the first planar ring and said pivotal flap of the second planar ring will enter the respective slits and cause said first and second planar rings to be positionally reversed in response to spool rotation in the film rewinding direction to make the second planar ring obscure the first planar ring.

3. A film cartridge as recited in claim 2, wherein said respective slits in the first and second planar rings only partially extend through said first and second planar rings.

4. A film cartridge as recited in claim 2, wherein said cartridge housing includes a peripherally raised end cap that defines a peripherally round recess, said film spool has a spool end portion that coaxially protrudes into said recess, and said first and second planar rings have respective center openings that receive said spool end portion.

5. A film cartridge as recited in claim 3, wherein said first planar ring has an outer diameter that is slightly less than the diameter of said recess to fix the first planar ring in the recess to said end cap and an inner diameter at said center opening of the first planar ring that is slightly greater than the diameter of said spool end portion to allow said film spool to be rotated relative to the first planar ring in the film unwinding and rewinding directions, and said second planar ring has an inner diameter at said center opening of the second planar ring that is slightly less than the diameter of said spool end portion to make the second planar ring rotate with said film spool in the film unwinding and rewinding directions and an outer diameter that is slightly less than the diameter of said recess to allow the second planar ring to be rotated in the film unwinding and rewinding directions relative to said first planar ring.

\* \* \* \* \*